United States Patent [19]

Nakamura et al.

[11] Patent Number: 4,972,932
[45] Date of Patent: Nov. 27, 1990

[54] SPRING CONNECTED ARMATURE ASSEMBLY FOR ELECTROMAGNETIC CLUTCH

[75] Inventors: Mamoro Nakamura; Hideya Hori, both of Aichi, Japan

[73] Assignee: Aisin Seiki Kabushiki Kaisha, Aichi, Japan

[21] Appl. No.: 413,818

[22] Filed: Jul. 28, 1989

[30] Foreign Application Priority Data

Sep. 29, 1988 [JP] Japan .................... 63-127998

[51] Int. Cl.$^5$ .................. F16D 27/108; F16D 27/16
[52] U.S. Cl. .................. 192/84 B; 192/84 C; 192/106.1
[58] Field of Search ............ 192/84 B, 84 C, 70.28, 192/106.1; 267/181, 158; 464/69, 98

[56] References Cited

U.S. PATENT DOCUMENTS

| | | | |
|---|---|---|---|
| 1,975,772 | 10/1934 | Davis | 192/106.1 |
| 2,407,757 | 9/1946 | MacCallum | 192/84 C |
| 3,368,657 | 2/1968 | Wrensch et al. | 192/84 C |
| 4,010,832 | 3/1977 | Puro | 192/84 C |
| 4,241,818 | 12/1980 | Miller | 192/84 C |
| 4,296,851 | 10/1981 | Pierce | 192/106.1 |
| 4,445,606 | 5/1984 | Van Laningham | 192/106.1 |
| 4,574,930 | 3/1986 | Koitabashi | 192/106.1 |
| 4,677,877 | 7/1987 | Anderson et al. | 192/106.1 |

*Primary Examiner*—Rodney H. Bonck
*Assistant Examiner*—Nicholas Whitelaw
*Attorney, Agent, or Firm*—Sughrue, Mion, Zinn, Macpeak & Seas

[57] ABSTRACT

In an electromagnetic clutch, the movable clutch plate which acts as an armature is connected to a drive member by a spring plate having a plurality of deformable arms. The deformable arms are rigidly connected to the drive member at one end thereof while the opposite ends of the arms are connected to the clutch plate by rivets with the reduced armature shank portions of the rivets being located in elongated holes in the ends of the arms. The heads of the rivets are located in notches in the drive member to prevent relative rotation of the clutch plate relative to the drive member while permitting axial movement relative thereto.

3 Claims, 8 Drawing Sheets

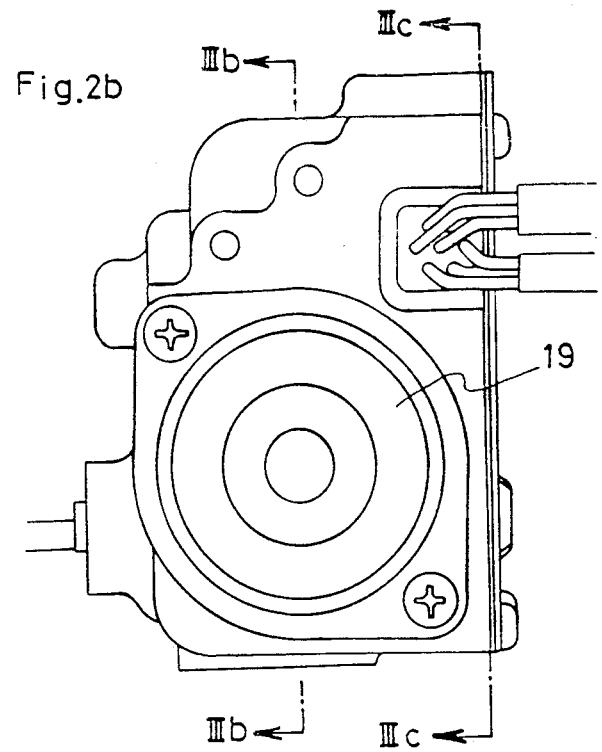
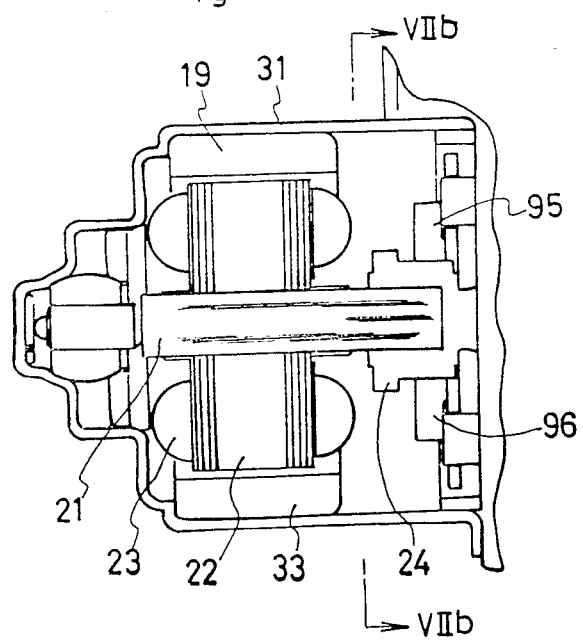

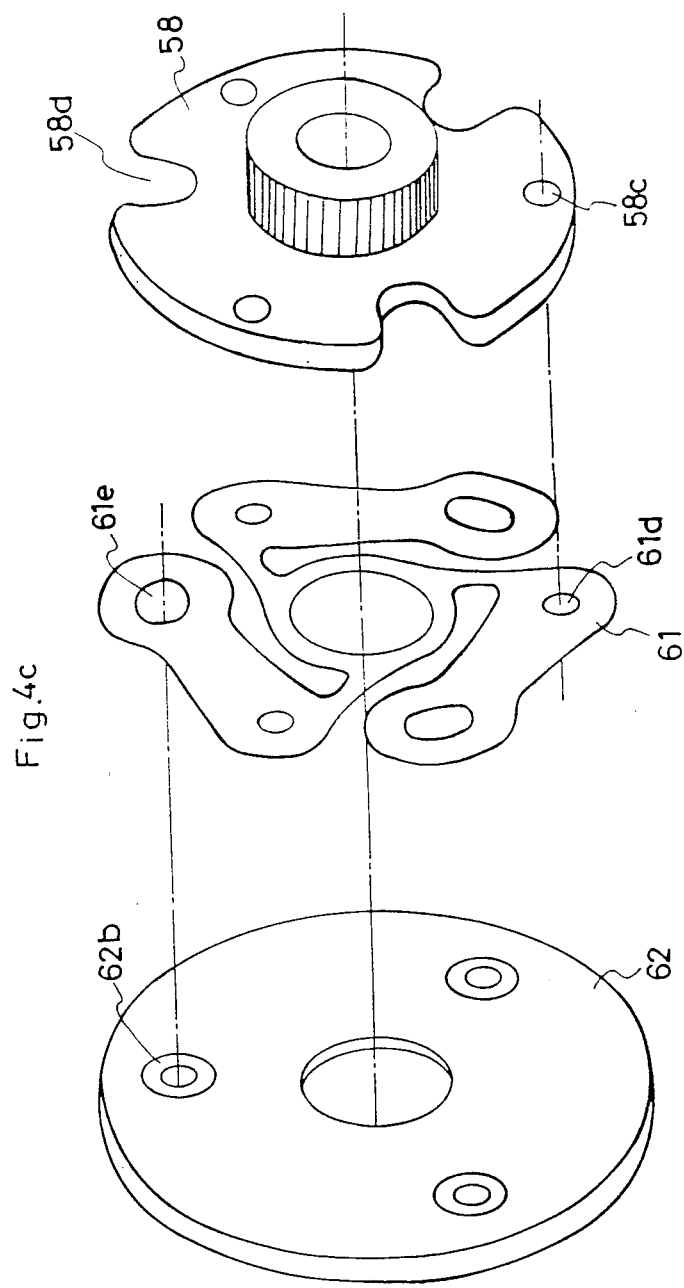

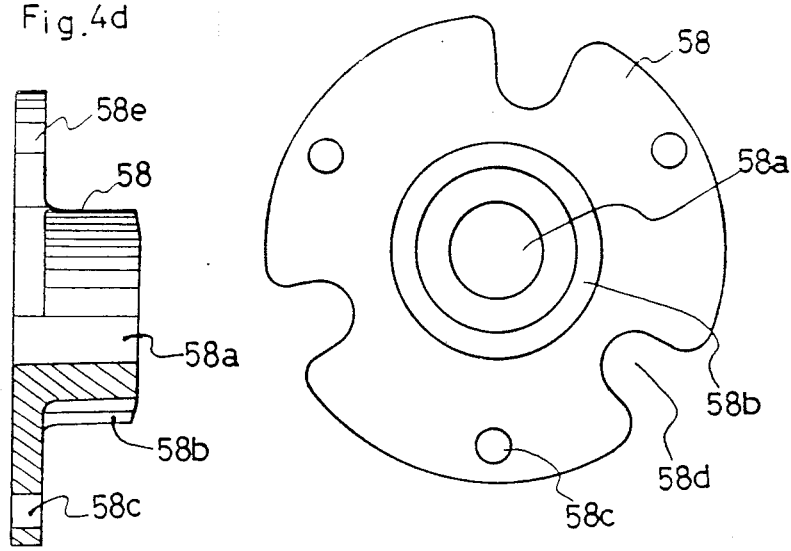
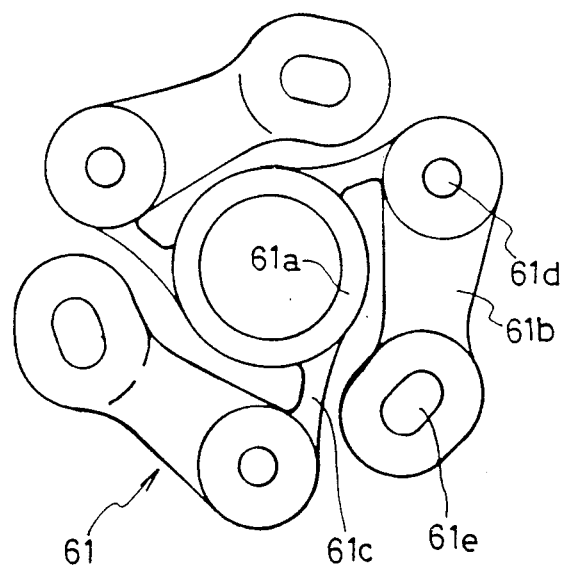

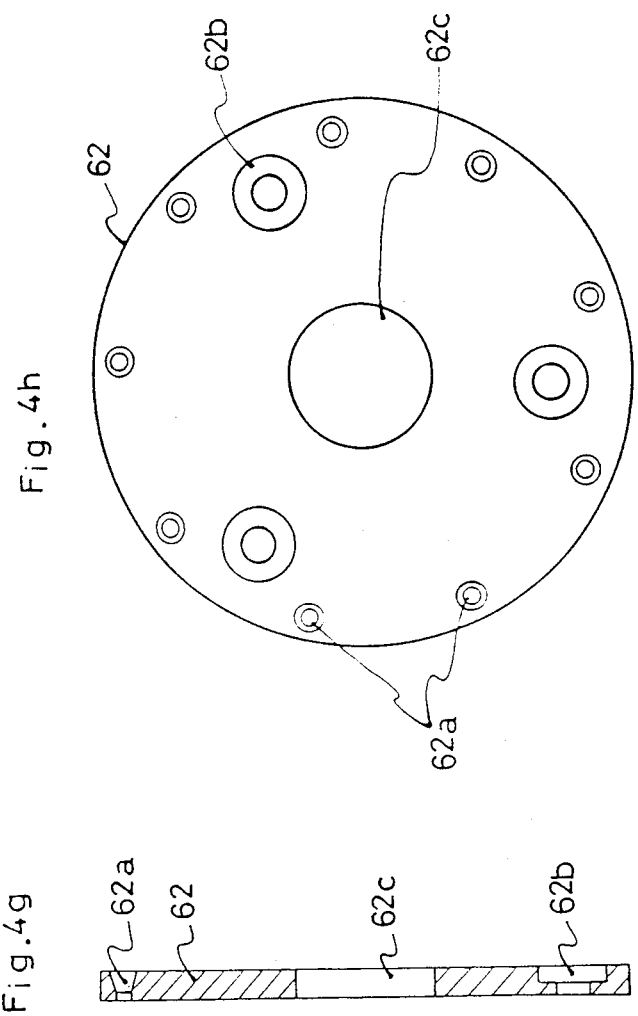

SPRING CONNECTED ARMATURE ASSEMBLY FOR ELECTROMAGNETIC CLUTCH

BACKGROUND OF THE INVENTION

The present invention relates to an electromagnetic clutch and more specifically to an electromagnetic clutch which uses the electromagnetic force generated between an electromagnet and a magnetic member and a spring to move the clutch plate carried by a gear into and out of engagement with the magnetic member.

An electromagnetic clutch is disclosed in laid open Japanese Utility Patent Application No. 53(1978)-32191. In this type of electromagnetic clutch, a movable member connected to the input shaft and a movable member connected to the output are opposed to each other. A clutch plate between the members is connected to one of the movable members through a return spring so that the clutch plate is movable in an axial direction. The clutch plate is brought into contact with the other movable member by an attracting force generated in an electromagnet. When the electromagnet is off, the clutch plate is moved away from the other movable member by the power of the return spring so the clutch is disconnected. In practice, a clutch plate or armature plate and a movable member are connected by more than three plate springs placed along the periphery of the rotating axis, as shown in Laid-Open Japanese Utility Patent Application No. 53(1978)-32191. This kind of plate spring looks like a plane plate but the opposite sides and the edges of the plate are slightly different in detail. In other words, each plate has a specific face and back and a desired orientation. Therefore, spring plates may be placed incorrectly when assembled. If a spring plate is misplaced, the gap between the spring and the clutch plate may be too narrow for the clutch to operate accurately. Furthermore, it takes time to place several spring plates in their correct places or it is possible to forget to place some parts when assembling the clutch.

SUMMARY OF THE INVENTION

Accordingly, one of the objects of the present invention is to produce an electromagnetic clutch which obviates the above drawbacks.

Another object of the present invention is to produce an electromagnetic clutch which has a simple structure and a fewer number of parts to reduce changes of making a mistake during assembly.

A further object of the present invention is to produce an electromagnetic clutch which has a spring in the form of a single plate in order to place a spring easily and correctly during assembly.

To achieve the above objects, and in accordance with the principles of the invention as embodied and broadly described herein, the electromagnetic clutch comprises an input shaft, an output shaft, a first shaft member rotatable in response to a movement of the input shaft, a second shaft member rotatable on the same axis of the first shaft member and connected the output shaft, spring means comprised of one plate having an annular support portion, a plurality of deformation portions extending substantially tangentially to said annular support portion in spaced relation thereto and a plurality of connecting portions connecting one end of the deformation portions with the annular support portion, a movable member connected to one of said shaft members by said spring means and facing the other of said shaft members, and electrical coil means for generating a magnetic force to move the movable member in an axial direction relative to the first and second shaft members.

In accordance with the above mentioned electromagnetic clutch, the spring is connected to a movable member which is a clutch plate and one of the shaft members is comprised of a single plate. The movable member or clutch plate is supported at a plurality of points on the deformation portions of the spring means so that the movable member or clutch plate is moved smoothly because of its good balance. The spring means is relatively large and is easy to locate correctly thereby reducing the chances of making a mistake during assembly. FUrther, the annular support portion of the spring is inserted onto the shaft member when it is assembled, thereby making it easier to place the spring in the right place.

BRIEF DESCRIPTION OF THE DRAWINGS

For a full understanding of the true scope of the invention, the following detailed description should be read in conjunction with the drawings; wherein

FIG. 2b is a side view of the actuator shown in FIG. 1.

FIG. 3b is a cross sectional view of the actuator shown in FIG. 2b along the line IIIb—IIIb.

FIG. 4b is a front view of the parts shown in FIG. 4a.

FIG. 4c is a perspective exploded view of the parts shown in FIG. 4a.

FIG. 4d is a cross sectional view of a pinion gear of the present invention;

FIG. 4e is a front view of the pinion gear shown in FIG. 4d.

FIG. 4f is a front view of a spring plate of the present invention.

FIG. 4g is a cross sectional view of a clutch plate of the present invention.

FIG. 4h is a front view of the clutch plate shown in FIG. 4g.

DETAILED DESCRIPTION OF THE INVENTION

A preferred embodiment of the present invention will be described with reference to the drawings. In this embodiment, an electromagnetic clutch is used in an actuator for controlling the opening of a throttle valve of an automobile engine.

Figure 1:
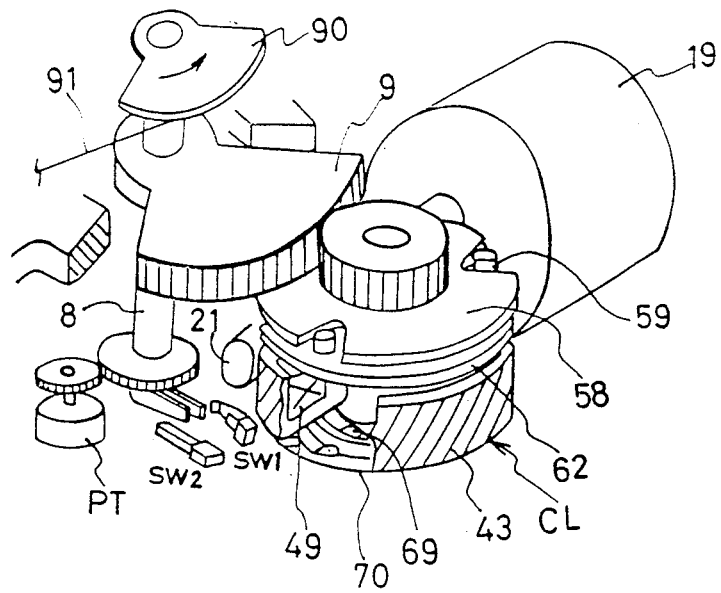
FIG. 1 is a perspective view of an actuator showing one embodiment of the present invention.

FIG. 1 is a perspective view of an actuator which uses an electromagnetic clutch of the present invention. A drive shaft 21 of an electric motor 19 is disposed in meshing engagement with a worm wheel 43 of an electromagnetic clutch CL. A pinion gear 58 of the electromagnetic clutch CL engages with a final gear 9. An arm 90 fixed to a shaft 8 which supports the final gear 9 is connected to a wire 91 which is connected to a throttle valve (not shown). Potentiometer PT and limit switches SW1 and SW2 are provided in operative relation to the shaft 8.

Figure 2A:
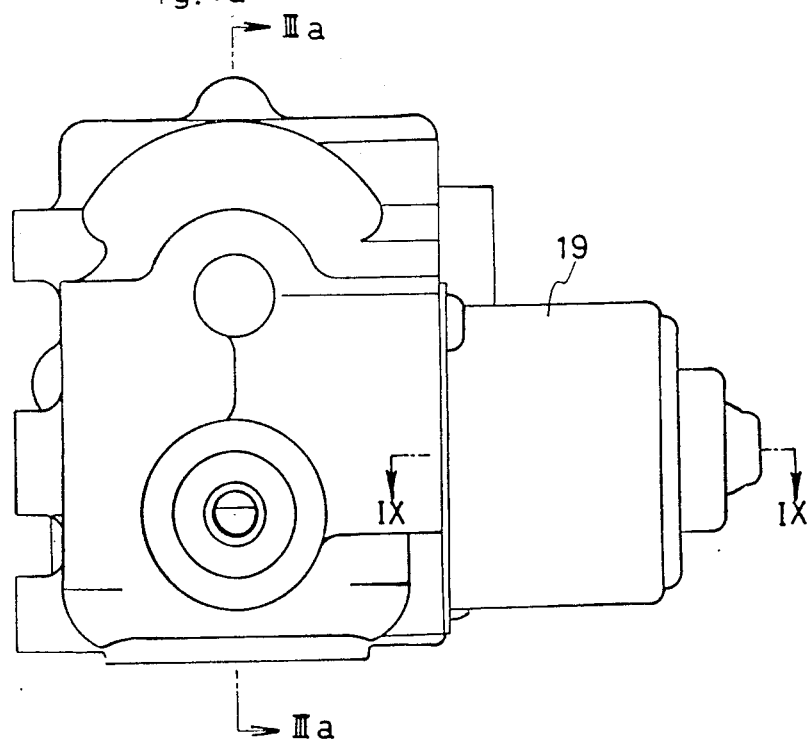
FIG. 2a is a front view of the actuator showing in FIG. 1.
Figure 3A:
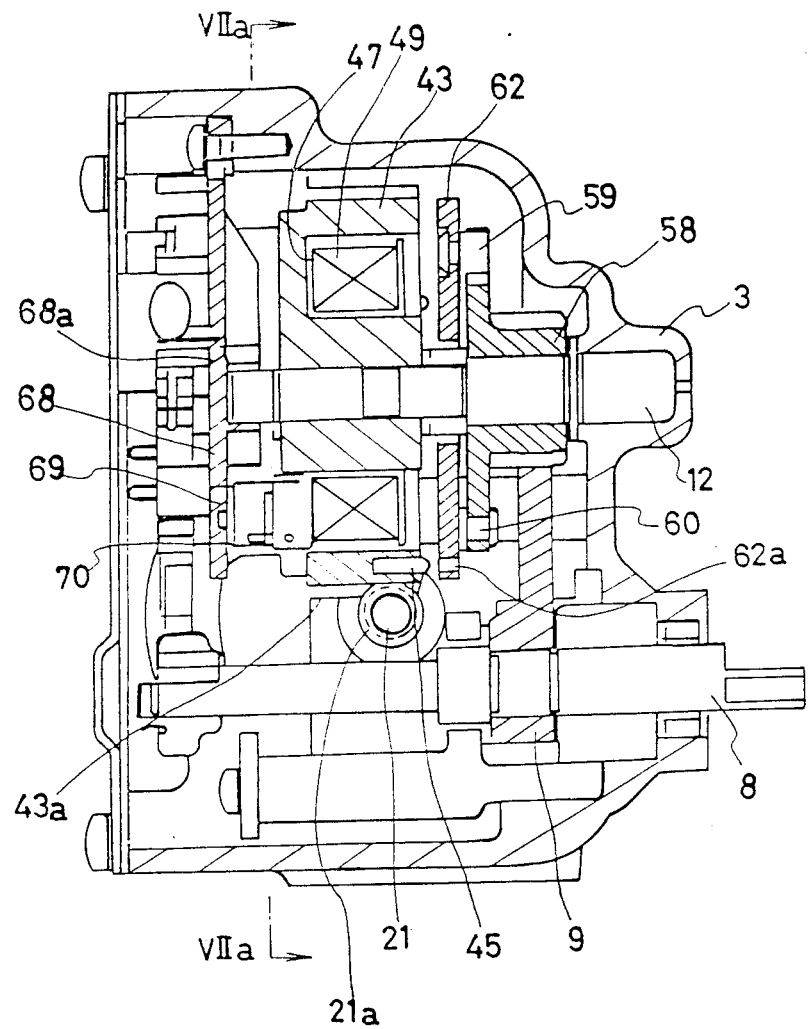
FIG. 3a is a cross sectional view of the actuator shown in FIG. 2a along the line IIIa—IIIa.
Figure 3C:
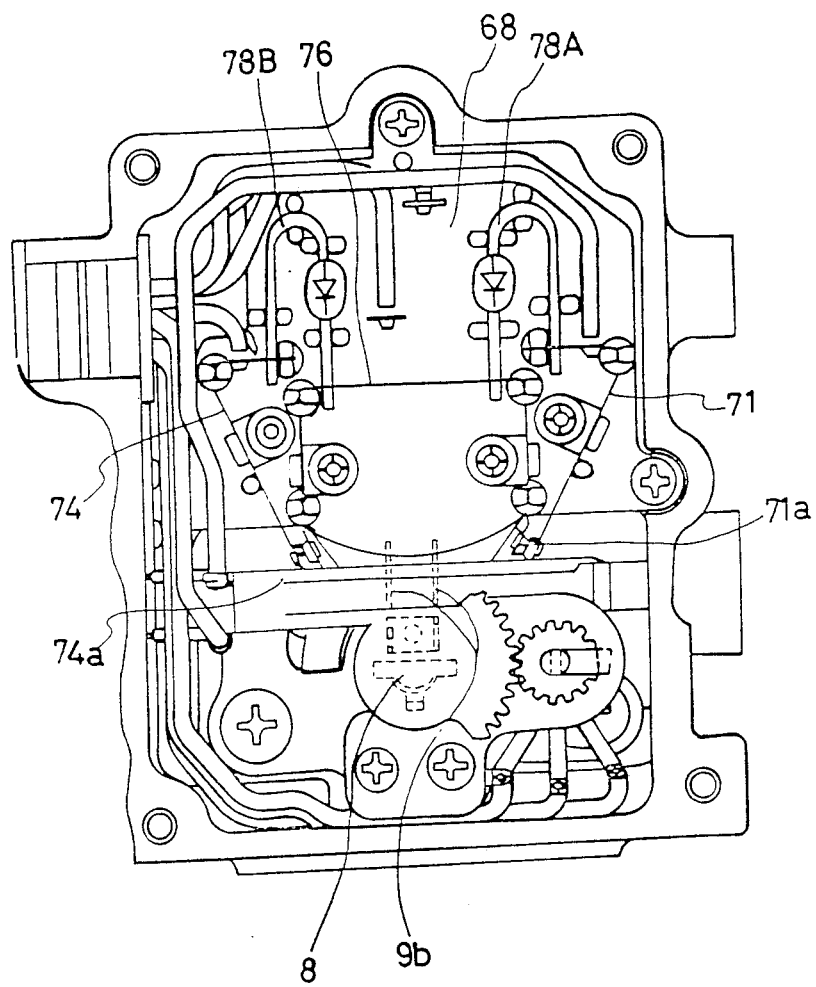
FIG. 3c a cross sectional view of the actuator shown in FIG. 2b along the line IIIc—IIIc.

FIGS. 2a and 2b show a front view and a side view of the actuator. FIG. 3a is a sectional view along the line IIIa13 IIIa of FIG. 2a. Referring to FIG. 3a, a gear 21a fixed to the shaft 21 connects with gear teeth 43a provided on the worm wheel 43. The worm wheel 43 is supported by a shaft 12 which is fixed to a housing 3 so that the worm wheel 43 rotates freely. The worm wheel 43 is made of magnetic material and includes an annular bobbin 47 and an electric coil 49. In FIG. 3a, at the right side of the wheel 43, a pinion gear 58 is rotatably supported on the shaft 12. A clutch plate 62 is provided between the wheel 43 and pinion gear 58. The clutch plate 62 is connected with the pinion gear 58 by a spring plate 61 and is movable in an axial direction parallel to the axis of shaft 12. The clutch plate is made of magnetic material. When electric power is supplied to the coil 49, the clutch plate is attracted by the wheel 43 and is moved into contact with the wheel 43. At the right side of the wheel 43, there are provided three holes equidistant from each other and from the center of the wheel 43. Pins 45 are inserted into the holes so the end of the pins are projected from the wheel 43. On the clutch plate 62, nine holes 62a are provided in order to connect the clutch plate 62 with wheel 43 when the ends of the pins 45 are engaged in the holes 62a. When electric power to the coil is cut off, the clutch plate 62 is moved toward the pinion gear by the spring plate 61 so that the wheel 43 is disconnected from the clutch plate 62.

Figure 4B:
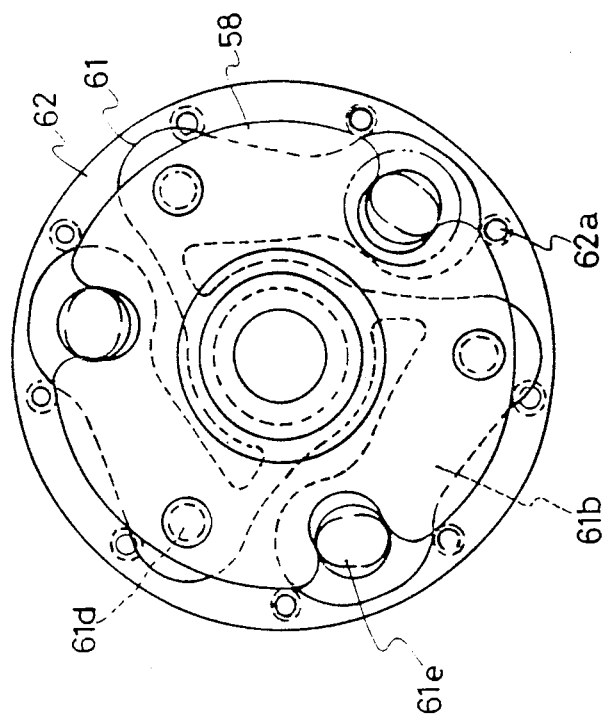
Figure 4A:
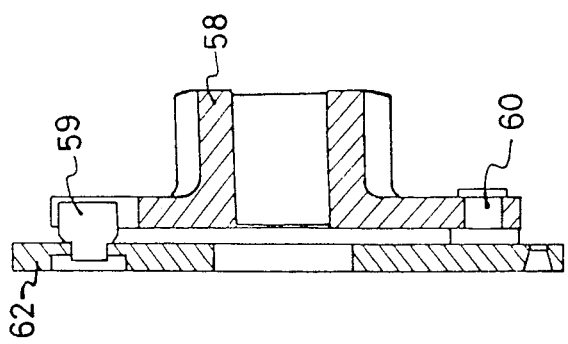
FIG. 4a is a cross sectional view of parts of the actuator of the present invention.

FIGS. 4a and 4b show the pinion gear 58, rivets 59 and 60, the spring plate 61 and clutch plate 62. FIG. 4c shows a perspective view. FIGS. 4d and 4e show the pinion gear 58, FIG. 4f shows the spring plate 61 and FIGS. 4g and 4h show the clutch plate 62.

Referring to FIGS. 4d and 4e, the pinion gear 58 comprises a gear portion 58b and a flange portion 58e. There are provided three holes 58c and three cut out portions 58d in the flange portion 58e. At the center of the pinion gear 58, a hole 58a is provided for the shaft 12.

Referring to FIG. 4f, the spring plate 61 has an annular support portion 61a, three deformation portions 61b extending substantially tangentially to said annular support portion in spaced relation thereto. Connecting portions 61c connect the annular support portion 61a with the deformation portions 61b. Each deformation portion 61b has a circular hole 61d at one end and an elliptic hole 61e at the other end. The spring plate is made from a single plate. The three deformation portions 61b of the spring plate 61 connect the pinion gear 58 and the clutch plate 62 so that the clutch plate 62 is supported at three points of pinion gear 58. Therefore, the power is transferred to the clutch plate 62 smoothly and the clutch plate 62 is prevented from uneven movement during its motions.

Referring to FIG. 4g and 4h, the clutch plate 62 is a disc shape and has nine holes 62a, three holes 62b and a center hole 62c. Each hole 62b has two portions of different diameters. FIGS. 4b and 4c show the assembly of the pinion gear 58, the spring plate 61 and the clutch plate 62. As shown in FIG. 4c, the holes 58c of the pinion gear 58 and the holes 61d of the spring plate 61 are connected by relatively small rivets 60 as shown in FIG. 4a. The holes 62b of the clutch plate 62 and the holes 61e of the spring plate 61 are connected by relatively large rivets 59 as shown in FIG. 4a. The large heads 59a of the rivets 59 are located in the cut-out portions or notch 58d in the flange of the pinion 58 as shown in FIGS. 4a and 4b. Thus the clutch plate 62 cannot rotate relative to the gear 58 but is free to move axially relative to the gear 58. The smaller diameter shank portion of the rivets are located in the hole 61e of the spring plate 61. The holes 61e are shaped like an ellipse so that the deformation portions 61b of the spring plate 61 are able to move relative to the clutch plate within the limits of the elliptic holes 61e. Thus the clutch plate can move axially even though the clutch plate 62 is connected with the pinion gear 58 by the spring plate 61.

In this embodiment, rivets 60 are made of non-magnetic material in order to prevent rivets 60 from being magnetized when the coil is energized. The gap between the rivets 60 and the clutch plate 62 is very small. On the contrary, the gap between the clutch plate 62 and the wheel 43 is relatively large in order to make the connection of pin 45 with the holes 62a correctly. Therefore, if the rivets were magnetized, the power of attraction exerted on the clutch plate 62 may become larger than the power of attraction between the wheel 43 and the clutch plate 62. Thus in this embodiment, rivets which are made of non-magnetic material do not affect the movement of the clutch plate 62.

The invention has been described in an illustrative manner, and it is to be understood that the terminology which has been used herein is intended to be in the nature of words of description rather than of limitation. Obviously, many modifications and variations of the present invention are possible in light of the above teachings. It is therefore to be understood that within the scope of the appended claims, the invention may be practiced otherwise than as specifically described.

What is claimed is:

1. An electromagnetic clutch comprising:
   an input shaft,
   an output shaft,
   a first shaft member rotatable in response to movement of said input shaft,
   a second shaft member rotatable on the same axis as said first shaft member and connected to said output shaft,
   a spring means comprises of a single plate having an annular support portion, a plurality of deformation portions extending substantially tangentially to said annular support portion in spaced relation thereto and a plurality of connecting portions connecting one end of each of said deformation portions with said annular support portion,
   a movable member axially disposed between said first and second shaft members for axial movement therebetween,
   connecting means connecting said movable member to one of said shaft members and connecting said spring means with lost motion to said movable member and fixedly to aid one of said shaft members, and
   electrical coil means for generating a magnetic force to move said movable member axially relative to said first and second shaft members.

2. An electromagnetic clutch according to claim 1, wherein each said deformation portion of said spring means has an elongated hole in an end of said deformation portion opposite to said one end of each deformation portion opposite to said one end of each deformation portion and said connecting means comprises first connecting means fixedly connecting said one ends of said deformation portions to said one of said shaft members and second connecting means providing a lost motion connection between said opposite ends of said deformation portions and said movable member while preventing rotation of said movable member relative to said one of said shaft members.

3. An electromagnetic clutch as set forth in claim 2, wherein said second connecting means is comprised of rivets having shank portions movably located in elongated holes in said opposite ends of said deformation portions of said spring plate.

* * * * *